![United States Patent Office]

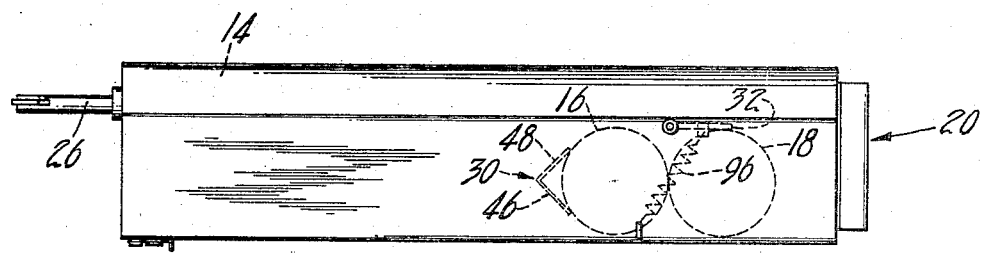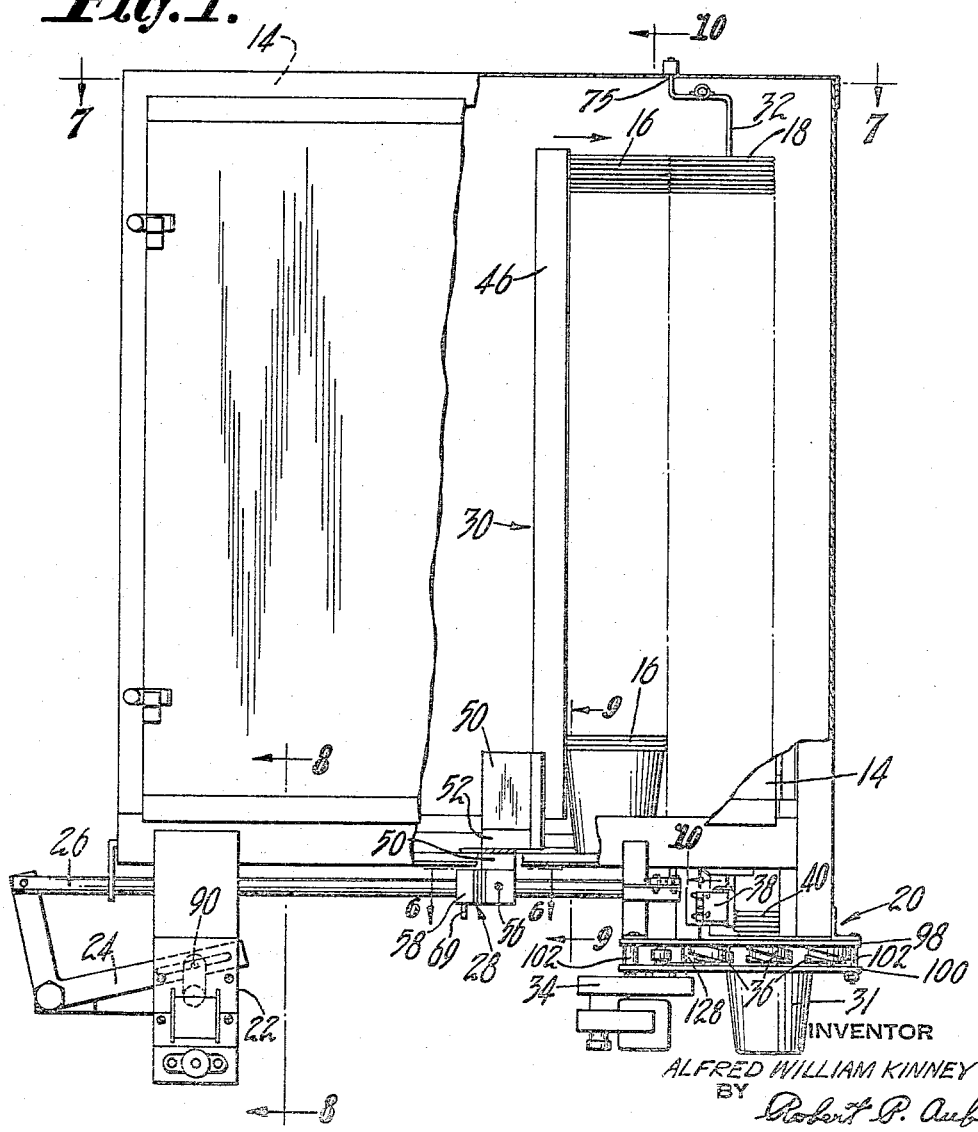

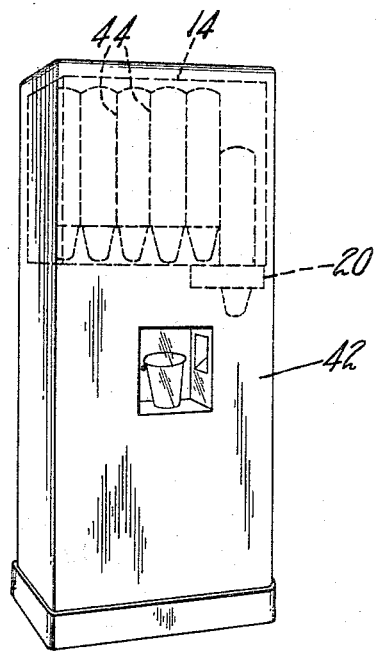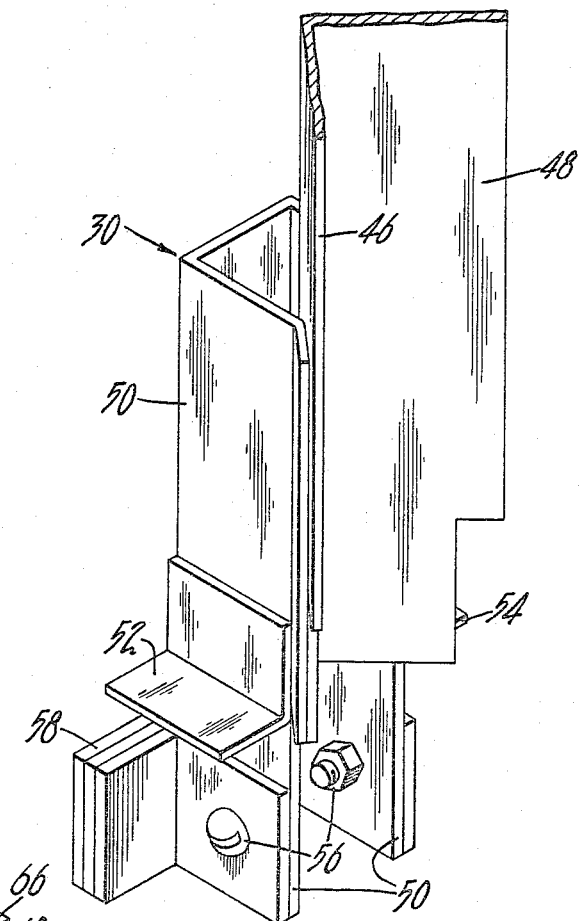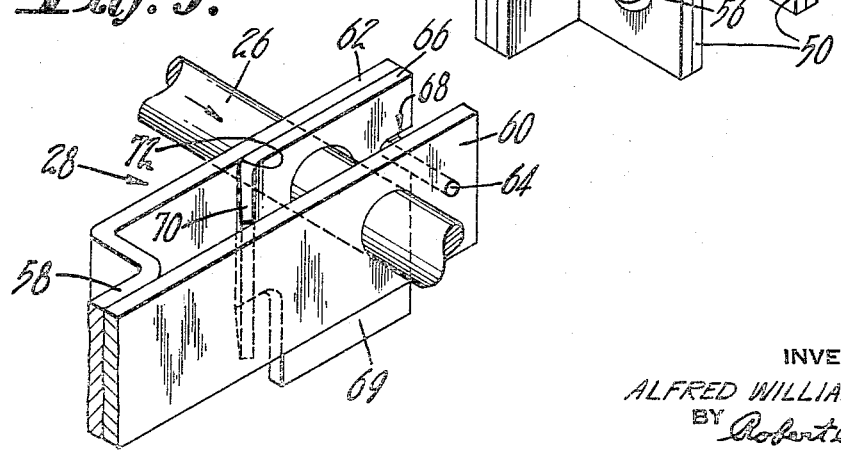

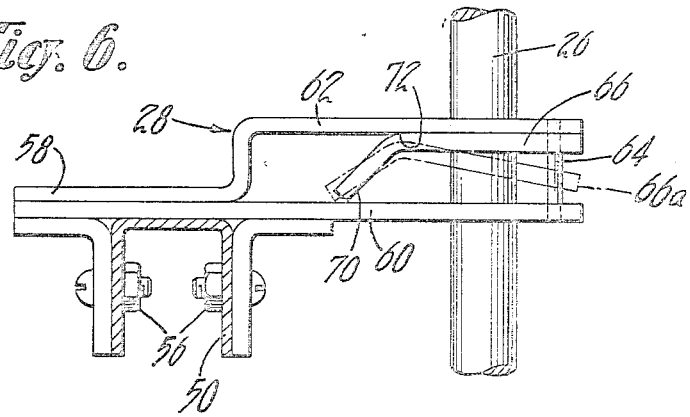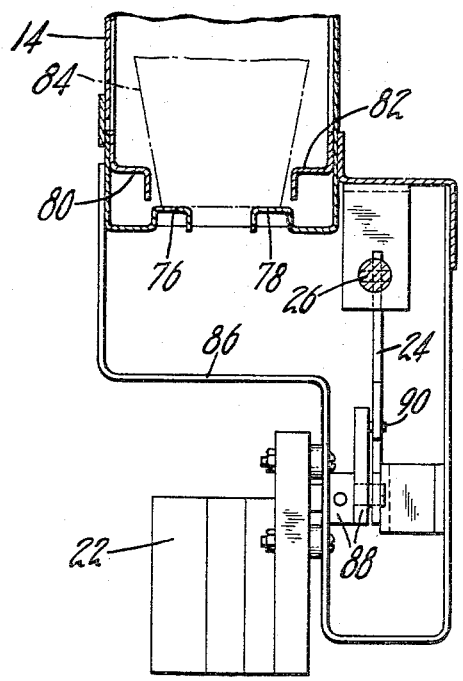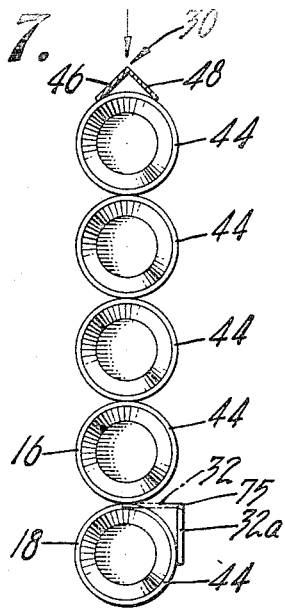

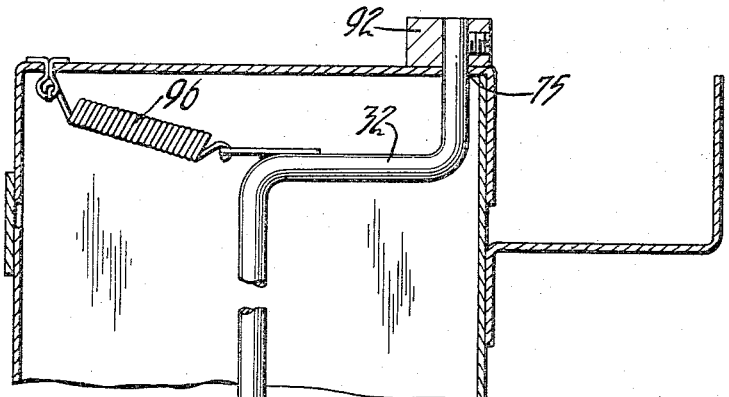
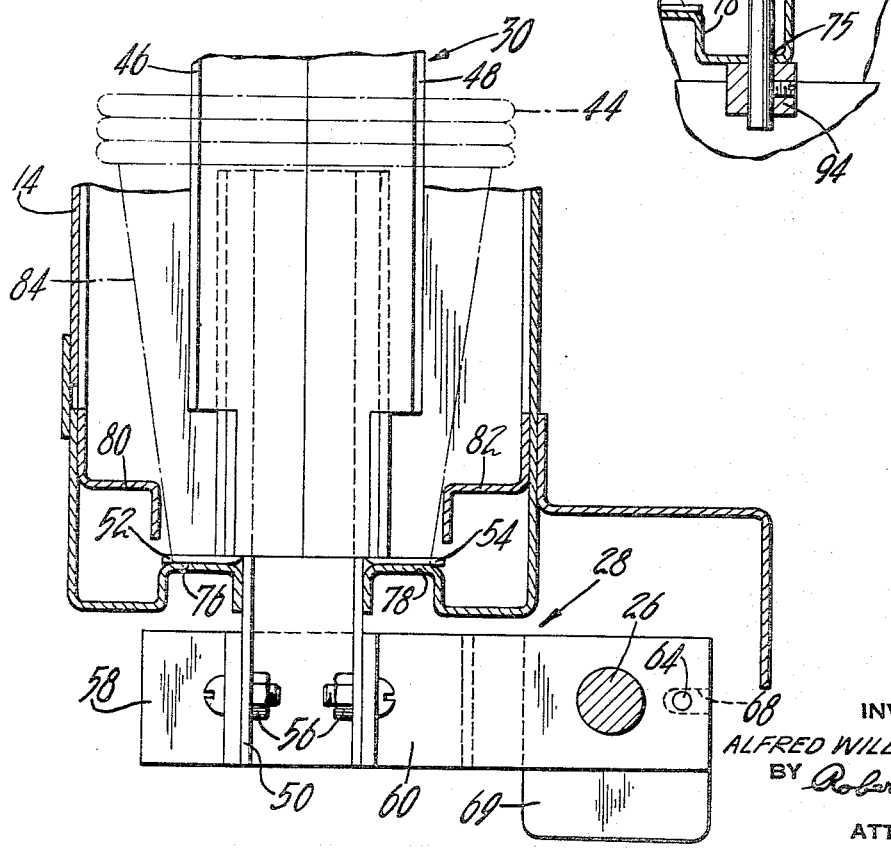

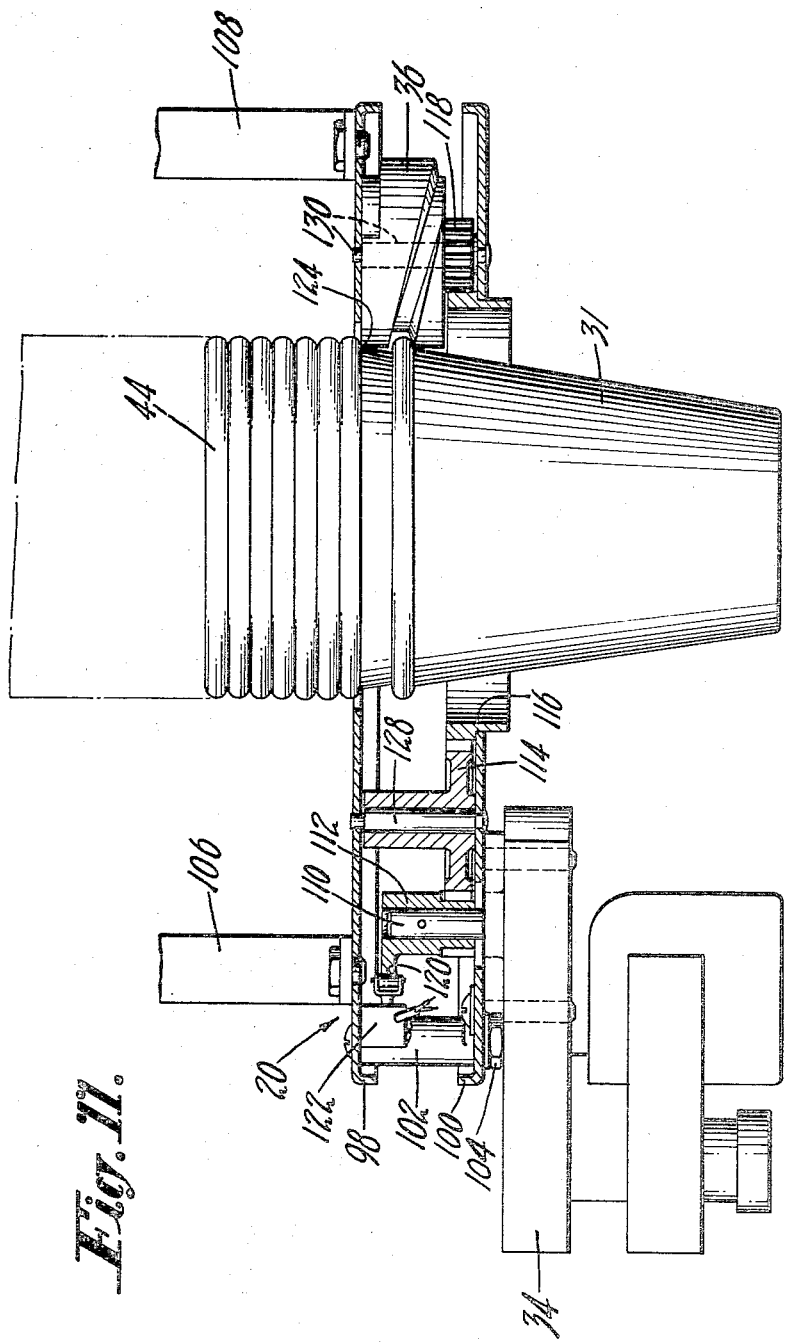

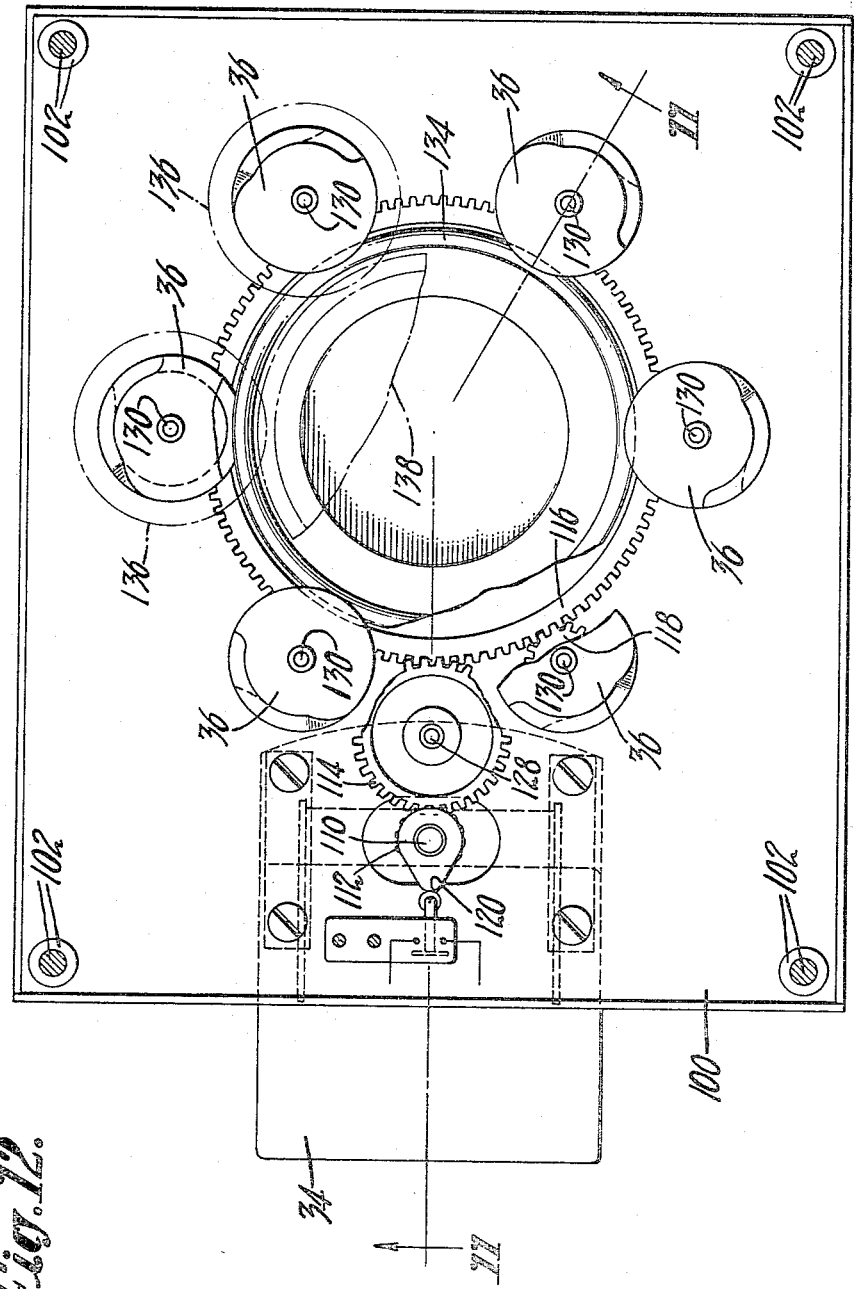

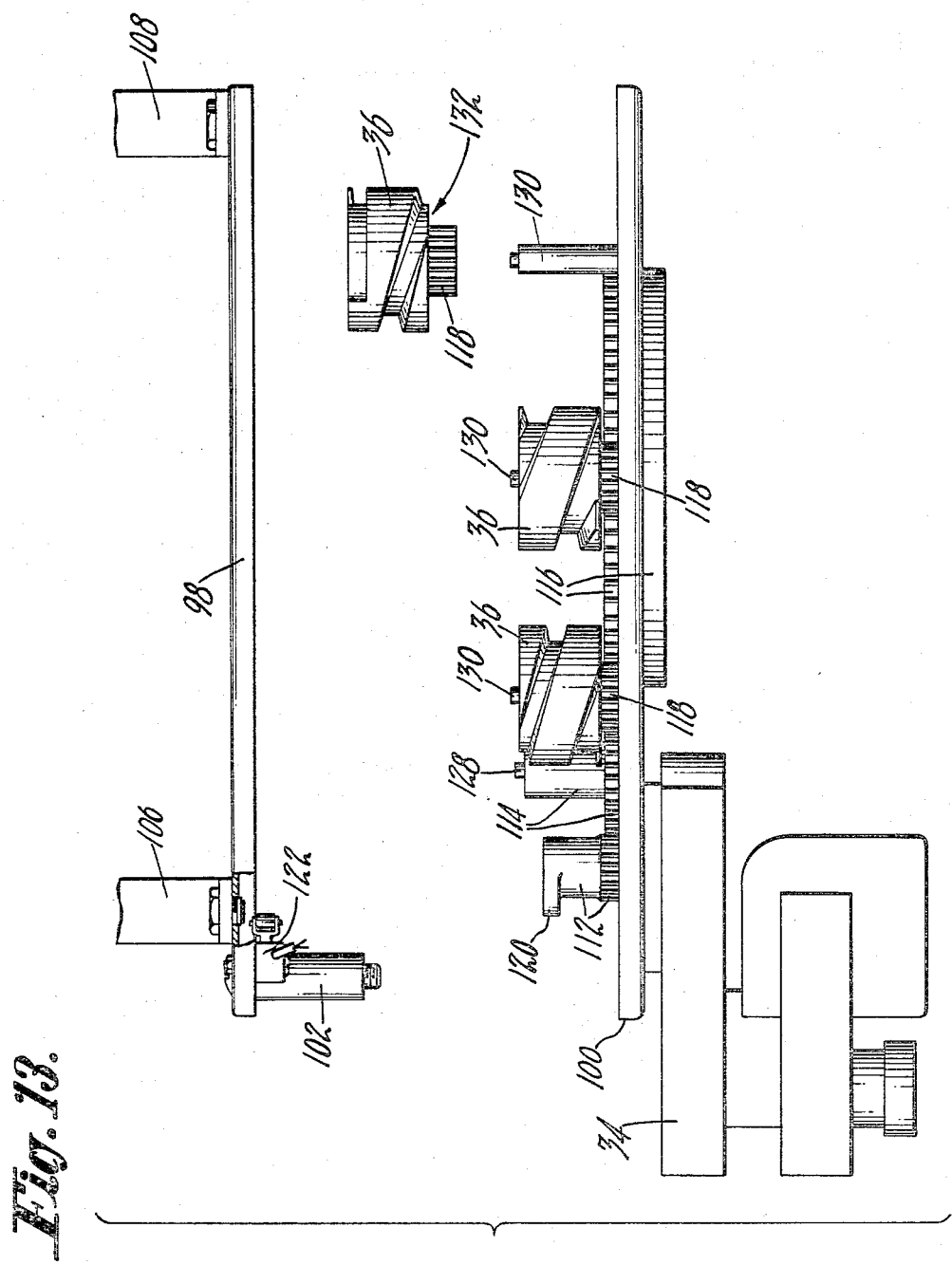

3,311,260
Patented Mar. 28, 1967

3,311,260
CUP DISPENSING APPARATUS
Alfred William Kinney, Syracuse, N.Y., assignor to American Can Company, New York, N.Y., a corporation of New Jersey
Filed Apr. 26, 1965, Ser. No. 450,729
4 Claims. (Cl. 221—11)

The present invention relates to dispensers for disposable cups, and more particularly to improved cup dispensing apparatus for trouble-free operation as a part of automatic liquid comestible vending machines.

Probably one of the most serious and common limitations of automatic coin operated beverage vending machines is failure in the delivery of a cup to contain the beverage to be vended. This failure often occurs simply because of depletion of the cup supply, but it can also occur through failure or malfunction of the cup dispensing apparatus. Since the cups are generally the bulkiest components of the product to be vended which must be stored within the vending machine cabinet, the efficiency of cup storage is a very important consideration. However, if the cup dispensing apparatus fails, even those cups which are stored are not available in the operation of the machine. Accordingly, it has been common in the past to compromise upon cup storage efficiency in order to try to assure trouble-free cup dispenser operation. For instance, the cups have often been stacked and stored in circular racks, storing the cups in stacks which are arranged in a circular array and rotated into operative position. Various other prior cup stack storage arrangements have employed elaborate structures such as individual magazine tubes for each cup stack to assure trouble-free descent of the cups.

It is an object of the presetn invention to provide a cup storage and dispensing apparatus which is particularly characterized by high storage efficiency.

Another object of the present invention is to provide for cup dispensing apparatus which is particularly characterized by a high degree of reliability in operation.

Another object of the present invention is to provide cup storage and dispensing apparatus in which there is a high degree of reliability and in which the space efficiency of cup storage is not compromised for purposes of reliability.

Another object of the present invention is to provide for cup storage and dispensing apparatus which incorporates the advantages of ease of service, ease of adjustment in servicing, simplicity of construction and low cost.

Another object is to provide cup storage and dispensing apparatus characterized by ease and convenience in loading.

One of the problems often encountered in automatic cup dispensers for beverage vending machines has been that it is difficult to provide for conversion of the cup dispenser, and particularly the cup separator part of the cup dispenser, to accommodate for cups of different sizes. Various approaches have been made to this problem. For instance, in U.S. Patent 2,946,481, Carew, a convertible cup dispensing mechanism is disclosed in which the cup separator worms are provided with journal bearing openings in a journal bearing plate having various different spacings from the center of the cup opening. In this way, the worms can be spaced at different distances from the center and accommodate for different cup sizes. However, that arrangement requires the installation of a different size ring gear for driving the worms, for each different position of the worms. But, the ring gear is not a part which normally needs to be replaced very often, and the changing of the ring gear and the bearing positions of all of the worms has been found to be a fairly intricate and time-consuming operation.

Another approach to this problem is illustrated in U.S. Patent 3,120,324, Amberg et al. In the apparatus of this patent, a rather complicated mechanism, including an iris plate, is arranged for continuous radial adjustment of the worms to accommodate and adjust for cups of various diameters. This arrangement is quite complex, requiring a separate intermediate drive gear between the main ring gear and each of the cup separator worms.

Therefore, it is another object of the present invention to provide a cup dispensing machine, and particularly a cup separator, which may be very simply converted for dispensing cups of different sizes.

A more particular object of the present invention is to provide a cup dispenser having a cup separator in which cups of differernt sizes may be accommodated simply by changing the cup separator worms. This is a very simple procedure in the structure of this invention because worm spindles are provided and there can be no question in the mind of the serviceman as to where to mount the worms. All the serviceman needs to know is which size worms to installl for a particular size of cup. Furthermore, installation of different worms is much more convenient than installation of a different ring gear because the worms are parts which become worn and need replacement more frequently than the ring gear and, therefore, they are parts which must be constantly stocked as replacements.

Another object of the invention is to provide cup storage and dispensing apparatus in which optimum utilization of cup storage capacity is realized such that, as the size of the cups is reduced, the number of cups which can be stored is increased.

Numerous other objects and advantages of the invention will be apparent as it is better understood from the following description, which, taken in connection with the accompanying drawings, discloses a preferred embodiment thereof.

In carrying out the above objects of this invention in one preferred embodiment thereof, there may be provided apparatus for dispensing paper cups from stacks of such cups including means for supporting a stack of cups in a first cup stack position and for dispensing the cups one cup at a time at the bottom of the first stack position. A support is provided for additional cups in additional cup stack positions adjacent to said first cup stack position. And means is provided including a reciprocating member and a one-way friction clutch for moving indiidual stacks of cups from the additional cup stack positions into the first stack position upon substantial depletion of the supply of cups in the first stack position.

In accordance with another feature, a preferred embodiment may also include an improved cup separator having a plurality of worm members spaced about the position for the bottom cup of the first cup stack and arranged to provide support under the rim of the bottom cup for the entire cup stack. The worms are rotatable to separate and dispense the bottom cup when required and to transfer support of the cups in the first stack position to the next cup in the stack. A frame member is provided having rigidly mounted spindle pins for rotatably supporting the worms. The worms are rapidly interchangeable by slidably removing the worms from the spindle pins.

Referring to the drawings:

FIG. 1 is a front view, partially in section, of a cup storage and dispensing apparatus in accordance with the present invention which is suitable for incorporation in the door of a beverage vending machine.

FIG. 2 is a top view of the apparatus of FIG. 1.

FIG. 3 is a perspective view of a beverage vending machine of the type which may incorporate the cup storage and dispensing apparatus of the present invention and showing the arrangement of storage of the stacks of cups.

FIG. 4 is a perspective view showing a detail of the structure of a cup stack pushing device employed in the apparatus of FIG. 1.

FIG. 5 is a perspective detail illustrating a one-way clutch structure which is employed to drive the pushing device of FIG. 4.

FIG. 6 is a top view of the one-way clutch structure of FIG. 5.

FIG. 7 is a partial sectional top view showing the arrangement of the column of stacks of cups in storage.

FIG. 8 is a sectional detail view of the cup stack supporting rack and a portion of the actuating mechanism and the actuating motor for the cup stack advancing apparatus of FIG. 1.

FIG. 9 is a partial sectional side detail view of a portion of the apparatus of FIG. 1 including the stack pushing device and the cup stack supporting rack, and associated components.

FIG. 10 is a partial sectional view illustrating the construction of a spring biased stack retainer which forms a part of the apparatus of FIG. 1.

FIG. 11 is a front detail view, partially in section, illustrating features of construction and operation of the cup separator portion of the apparatus of FIG. 1.

FIG. 12 is a top view of a partially disassembled portion of the cup separator of FIG. 11.

FIG. 13 is an exploded view of the cup separator of FIG. 11 illustrating the ease with which the cup separator can be disassembled for servicing and for conversion to operation with different cup sizes.

The apparatus of FIG. 1 includes a cup enclosure 14 for storing a plurality of stacks of disposable cups, as indicated for instance at 16 and 18. The cups are individually dispensed, as required, from the first cup stack position (at the far right in FIG. 1) by a cup separator indicated generally at 20. When the cups in the first stack are substantially depleted, a stack advancing motor 22 is energized, causing clock-wise rotation of a bell crank 24, and consequent movement of a rod 26 to the right in the drawing. Rod 26 operates through a one-way clutch 28 to engage a cup stack pushing device 30 to push all of the stacks of cups 16 and 18 to the right, to advance the stack 18 into the first stack position. As shown in FIG. 1, the stacks of cups 16 and 18 are partially advanced, and the stack 18 is almost into the first stack position in registry with the next individual cup 31 to be dispensed by the cup separator 20.

To separate the cups in the first stack position from the other cup stacks, and assure the free descent of all of these cups, a pivoted stack retainer 32 is provided. This device is spring biased back against the second cup stack, and away from the first cup stack, so as to prevent the cups in the second cup stack position from engaging and interfering with the free descent of the cups in the first cup stack position. As shown in FIGS. 1 and 2, this retainer 32 has been swung open to permit the cups in the second stack position to advance into the first stack position.

The cup separator 20 includes a motor 34 which is operable in response to the demand for an individual cup, to cause one complete rotation of the cup separator worms 36, to release only the bottom cup 31 so that it may drop into position to receive the beverage which is being vended. This operation of the cup separator is conventional.

The need for a new stack of cups in the first cup stack position is detected by means of a normally closed switch 38 having an operating cam which maintains it in the open position as long as there are sufficient cups in the first cup stack position, the edges of the cups riding against the switch operating cam. However, when the cups in the first stack postion are depleted to the level indicated at 40 so that they consist only of a small bottom group of cups, the operating cam of switch 38 is disengaged, the switch closes, and the stack pushing motor 22 is energized.

The energization of motor 22 continues until the the new stack, such as stack 18, is advanced far enough to drop down into nesting relationship with the bottom group of cups, thereby opening the contacts of switch 38.

FIG. 2 is included simply to illustrate more clearly the relationship of certain of the components illustrated in FIG. 1.

FIG. 3 illustrates a beverage vending machine 42 which may conveniently incorporate the cup dispensing apparatus of FIG. 1 in the front of the cabinet thereof. Preferably, the cup dispensing apparatus is incorporated in the front door of the vending machine cabinet so that, when the door is opened for the purpose of replenishing supplies and cleaning and service, a fresh supply of cups can be easily loaded into the cup enclosure 14. The storage positions of the stacks of cups are indicated at 44 in FIG. 3. It is a particularly advantageous feature of the present invention that the cups may be stored in the cup dispensing apparatus in a straight column of stacks of cups, and the movement of the cup stacks is always in the same direction so that there is no question as to which cups have been in the machine for the longest period. The straight line arrangement of the stacks of cups within the machine provides for particularly convenient and compact cup storage.

FIGS. 4–5 illustrate various details of construction of the cup dispensing apparatus, with particular emphasis upon the operating parts of the cup stack advancing mechanism.

FIG. 4 is a perspective detail view of the lower portion of the structure of the stack pusher 30. This may conveniently include an L section angle piece having two sides 46 and 48 arranged essentially at 90 degrees to one another for engagement with the last stack of cups, as particularly illustrated in FIG. 2 and FIG. 7. Welded to the angle member 46–48, there is a supporting body member 50 having, in turn, a bracket 52 which is preferably welded thereto. A bracket 54 corresponding to 52 is provided on the opposite side of body member 50, but is almost entirely hidden in FIG. 4. Bolted to the bottom of the body member 50, at 56, is a frame 58 of the clutch 28, previously referred to in connection with FIG. 1.

The main operating portion of the clutch 28 would appear to the right and behind the body 50 of the stack pusher, as shown in FIG. 4. However, this structure is omitted from FIG. 4 for purposes of clarity, and is shown instead in FIG. 5.

FIG. 5 shows a perspective view of the details of the operating parts of the clutch 28. The frame 58, which is not shown fully in FIG. 5, is attached beyond the broken end at the left of FIG. 5 to the bottom of the cup stack pusher as previously explained in connection with FIG. 4. The frame 58 separates into a leading plate 60 and a following plate 62. Fastened between these plates there is a pin member 64. The push rod 26 is threaded through suitable clearance holes in both of the plates 60 and 62. Also threaded onto the rod 26 is a clutch engagement plate 66, which is loosely positioned between the plates 60 and 62. The plate 66 is provided with an integral slot 68, forming legs which straddle the pin 64 to prevent the plate 66 from rotating about the rod 26. With the plate 66 in the position as shown in FIG. 5, the clutch 28 is disengaged. Plate 66 includes a tab portion 69, the function of which will be described below.

FIG. 6 is a top view, partly in section, taken at section 6—6 in FIG. 1, and showing the structure of clutch 28 with the complete frame 58, and its attachment to the body 50 of the cup stack pusher. As shown in FIGS. 5 and 6, the engagement plate 66 is a very simple structure having a bent leg portion 70 extending towards the leading plate 60. In the operation of the clutch, as the push rod 26 moves forward (downward in FIG. 6) it carries the clutch engagement plate 66 with it to the dotted position shown at 66A. In the position 66A, the engagement plate 66 is rotated by reason of the engagement of the leg portion 70 with the leading plate 60. The hole in the engagement plate 66 through which the push rod 26 is threaded provides a loose fit around the surface of push rod 26. This fit is such that the push rod 26 slides freely through the engagement plate 66 whenever the engagement plate is positioned flat against the following plate 62 of the clutch, as shown in full in FIGS. 5 and 6. However, when the engagement plate 66 is tilted with respect to the push rod 26, as shown in dotted outline at 66A, it is caused to bind upon the push rod 26 and to thereby form a positive non-slip engagement therewith. Accordingly, the movement of the push rod 26 is directly transmitted through the leg 70 of the engagement plate 66 to the leading plate 60 of the clutch and thereby to the cup stack pusher 30.

When the rod 26 reciprocates in the other direction (upward in FIG. 6) the movement carries the clutch engagement plate 66 back against the following plate 62, the heel portion shown at 72 striking against the plate 62, and causing the plate 66 to rotate back to the untilted position against the following plate 62. In this position of the engagement plate 66, the clutch is disengaged, and therefore, the rod 26 proceeds to its retracted position without carrying the clutch 28 and the cup pusher 30 with it. Thus, the clutch 28 is truly a one-way clutch providing only for advancement of the cup pusher in response to reciprocating movement of the push rod 26.

Whenever the enclosure 14 is to be refilled with cups, the clutch 28 is easily maintained in the disengaged condition while moving the cup stack pusher 30 back to the far left-hand position when viewed in FIG. 1. This may be done by the beverage machine service operator by grasping the lower tab portion 69 of the clutch engagement plate 66 and pushing the clutch and the associated cup stack pushing device 30 back to the fully open position entirely by means of force exerted against this tab. This mode of manual operation of the clutch maintains the engagement plate 66 disengaged during the reverse movement and provides a very simple method for resetting the position of the cup stack pusher 30.

FIG. 7 is a partial sectional top view taken at section 7—7 in FIG. 1, and showing how as many as five stacks of cups are arranged in storage and advanced when required. As pictured in this figure, the first cup stack position for the column of cups is at the bottom, somewhat beyond the position shown for stack 18, and pressure by the cup stack pusher 30 on the last cup stack causes advancement of all of the cup stacks so that the cup stack 18 from the second stack position is caused to be advanced into the first stack position. FIG. 7 also illustrates the mode of operation of the stack retainer 32. Before the commencement of a cup stack advancing cycle, the stack retainer 32 is spring biased and retained against the leading edge of the cup stack in the second cup stack position as shown in dotted outline at 32A. Stack 16 has almost advanced to this position in FIG. 7. Upon depletion of the cups in the first stack position, the stack advancing cycle is commenced, and as the cups in the second stack position move forward (downward in FIG. 7) the stack retainer 32 pivots about its pivot point shown at 75 and swings open like a gate to the position shown. As the cup stack moves from the second position to the first position, the stack is thereby released by the stack retainer 32, and the stack retainer swings back, under the influence of its return spring, to the original position at 32A to retain all of the cup stacks other than the first cup stack in proper position, and away from any interference with the cups in the first stack position. The structure of the cup stack retainer 32 is illustrated and described below in greater detail in connection with FIG. 10.

FIG. 8 is a sectional detail view of the lower portion of the enclosure 14 taken at section 8—8 in FIG. 1, and showing the construction of the motor 22, the bell crank 24, and the associated apparatus. The bottom portion of the cup enclosure 14 is arranged to form a rack having two shelf portions 76 and 78 which are arranged to support the bottom cup of each of the stacks of cups which are in storage, and to provide a slidable surface upon which the cup stacks may be moved. The interior of the enclosure 14 is provided with guide brackets 80 and 82 which maintain a precise positioning for the bottom cup of the cup stack, as illustrated at 84.

The cup stack advancing motor 22 is mounted upon a bracket structure 86, which also supports the end of the push rod 26, and the fulcrum pivot of the bell crank 24. Attached to the shaft of the motor 22, there is a motor crank 88 which is provided with a pin 90 which engages in a slot in the bell crank 24. When the motor 22 is energized, the motor crank 88 rotates and causes reciprocatory movement of the bell crank 24, and thus imparts reciprocating movement to the push rod 26.

FIG. 9 is a sectional detail view taken at section 9—9 of FIG. 1 and showing the same lower portions of the cup enclosure as illustrated in FIG. 8. This figure also illustrates how the cup stack pusher 30 is supported upon the shelf portions 76 and 78, and how the cup stack pusher 30 and the clutch mechanism 28 are attached and combined. As shown in FIG. 9, the brackets 52–54 of the cup pusher structure 30 engage with the shelf portions 76 and 78 and thereby support the cup pusher. Furthermore, the cup pusher is maintained in rectilinear alignment by a guiding engagement between the outside edges of the body member 50 of the cup stack pusher 30 and the facing inner edges of the shelf portions 76 and 78.

FIG. 10 is a foreshortened sectional detail view taken at section 10—10 in FIG. 1 illustrating a preferred construction for the stack retainer 32 and the associated components. The stack retainer 32 consists of a steel rod having an S bend at each end to form a pivoted gate structure. The ends are retained in position through suitable bearing holes in the enclosure 14 by means of bushings 92 and 94 which are held in place upon the rod structure by set screws. The stack retainer "gate" is spring biased to the closed position by means of a spring 96. It will be observed that the spring 96 maintains the retainer 32 in the closed position even though no cup stacks are present to exert pressure against the retainer. However, when cup stacks are advanced against the retainer, it pivots open as illustrated and described previously in connection with FIG. 7.

FIGS. 11, 12, and 13 illustrate various features of the construction of the preferred cup separator structure 29 employed in the cup dispensing apparatus of this invention.

FIG. 11 is a sectional detail view taken on a cross section 11—11 as indicated in FIG. 12. The cup separator structure includes upper and lower frame members 98 and 99 and 100 which are mounted together in spaced relationship by means of mounting posts 102, only one of which is shown in FIG. 11. There are preferably four such mounting posts 102 located at the respective corners of the frame members 98 and 100. The posts 102 are preferably permanently mounted to the upper frame member 98, and the lower plate 100 is held on the mounting posts 102 by nuts 104. The entire cup separator mechanism is mounted and held upon the cup dispenser apparatus by means of suitable brackets 106 and 108, which are fastened to the upper frame member 98.

The cup separator motor 34 is mounted upon the lower frame member 100, and the motor shaft 110 has pinned thereto a pinion gear member 112 which meshes with an intermediate drive pinion gear 114. The drive pinion gear in turn meshes with a ring gear member 116 which surrounds the downward path of the cups which are being dispensed. The ring gear 116 meshes with pinion gears 118 which form the bottom portion of each of the cup dispensing worms 36. Only one of the worms 36 is shown in FIG. 11, but there are preferably provided a total of six worms at equally spaced positions around the ring gear 116.

The gear member 112, on the shaft of motor 34, includes at the upper end thereof a cam 120, which is shown in FIG. 12. This cam is arranged to operate a small normally closed switch 122, which is shown in FIG. 11, but not in FIG. 12. Both of these components are shown clearly in the exploded view of FIG. 13. The switch 122 is effective as a limit switch to turn off the cup separator motor 34 after one complete revolution of the worms 36.

In operation, when a starting signal is supplied to the cup separator, the motor 34 is started, and the cam 112 on the motor shaft moves away from the central position shown in FIG. 12 so as to release the switch 122 and allow the switch contacts to close. Thereafter, the motor 34 remains energized though the starting signal is removed, until there is a complete rotation of the motor shaft 110 and each of the worms 36 to dispense one cup 31. When the rotation of the motor shaft 110 is complete, the cam 120 has returned to the starting position, as shown in FIG. 12, and operates the switch 122 to the open position, thus stopping the cup separator motor 34.

The gear portion of the gear member 112 on the shaft 110 of the motor 34 corresponds exactly in diameter and number of gear teeth to the gear portions 118 of the worms 36. Thus, a single full rotation of the motor shaft 110 advances both the intermediate drive gear 114 and the ring gear 116 by the precise number of gear teeth corresponding to a single full revolution of each of the worms 36. The worms 36 are arranged in the usual manner of the worms of cup separators so as to support the entire stack of cups in the first stack position at the rim bead of the bottom cup. Upon rotation of the worm, the leading edge of the thread of the worm engages between the bead of the bottom cup and the bead of the cup next to the bottom, transferring support of the cup stack to the cup next to the bottom, and causing the bottom cup to be separated from the stack and dispensed by allowing it to drop through the central opening of the ring gear 116. In FIG. 11, the worm 36 is shown in an intermediate position in the cycle of the cup separator, in which support of the cup stack has been transferred to the bead of the second cup at 124, and the bead of the first cup 31 is engaged in the thread slot of the worm 36, as indicated at 126. While the other five worms 36 are not shown in FIG. 11, it will be understood that they are intended to be present and that the beads of both the first and second cups are engaged by all six worms in essentially the same way as illustrated in FIG. 11 for the single worm shown. The leading edge of the worm thread at the top of each of the worms 36 is preferably in the form of a sharp knife edge. This knife edge is effective to separate the rim bead of the bottom cup from the bead of the cup next to the bottom even when cups of the closely-nested type are employed. As illustrated in FIG. 11, these cups have little or no vertical space between the beads of adjacent cups in the cup stack.

One of the most important structural features of the present cup separator resides in the provision of spindle pins 128 and 130 for mounting and supporting the intermediate gear 114 and the worms 36. These spindle pins are rigidly mounted and secured to the lower frame member 100 by means such as riveting the lower end of each pin within its mounting hole. The upper end of each of the pins 128–130 is securely positioned within a suitable mounting hole in the upper frame member 98 whenever the frame members 98 and 100 are assembled together by means of mounting posts 102. However, whenever it is desired to disassemble the cup separator for servicing or adjustment, as explained more fully below, it is only necessary to remove the four mounting post nuts 104, and the lower frame member 100 may then be dropped free from the upper frame member 98, the upper ends of the pins 128–130 sliding freely out of the positioning holes provided for them in the upper frame member 98. Because of the unique arrangement of the structure of the cup separator 20, the motor 34 and all of the gears and worms are thus separable with the lower frame member 100 from the upper frame member 98.

FIG. 12 illustrates a top view of the separated lower frame member 100 together with the components which are supported upon that frame member and separable from the upper frame member 98.

FIG. 13 is an exploded side view of the cup separator 20 further illustrating the mode of disassembly just described. One of the most important advantages of this arrangement is that if the cup separator worms become worn, or must be changed for any other reason, they can be easily removed, as indicated at 132, by simply sliding them upwardly and off of the associated spindle. As soon as the worms 36 are removed, the ring gear 116 may be removed, if desired, by simply lifting it out of its bearing hole in the lower frame member 100.

The convenience of the disassembly of the cup separator 20, as described immediately above, is particularly apparent when it is considered with respect to the entire assembly of the cup dispensing apparatus as illustrated in FIGS. 1, 2, and 3. Thus, if servicing of the cup separator is required, after opening the cabinet of the beverage dispensing machine to expose the cup dispenser apparatus, it is only necessary to remove the four nuts 104, which are easily accessible, in order to lower the frame member 100 and all of the associated components. The worms 36 may then be slipped off for replacement, or other parts may be easily replaced with very little difficulty.

It is one of the most important features of this invention that because of the ease with which worms may be replaced in this cup separator, it is very simple to adapt the cup dispenser apparatus to accommodate for cups of different sizes by simply substituting worms of different diameters. Thus, with particular reference to FIG. 12, with the small diameter worms illustrated, a large cup having an outer bead circumference as indicated by the dotted arc at 134 is accommodated. However, by simply changing to a larger diameter worm, as indicated in dotted outline at 136, a samll diameter cup may be accommodated as indicated by the dotted arc 138. For such a conversion, it is not necessary to change the ring gear 116, or the drive gear 114, or any other part. Only the worms need be changed. Since the gear portions 118 of all of the worms are uniform, the worms are always given one complete rotation on each operating cycle, no matter what the outer diameter of the rim engaging portion of the worms may be.

The ease with which worms of different sizes may be substituted is particularly apparent when it is appreciated that the same spindle pins 130 are always used for mounting the worms, no matter what size worms are employed. Thus, a serviceman of very limited knowledge and ability can easily adapt the cup separator to operate with different cup sizes.

After any such servicing of the cup separator, it is a very simple matter to reassemble the lower frame member 100 upon the ends of the mounting studs 102 and to refasten this frame member into place with the stud nuts 104. The upper ends of the spindles 128 and 130 readily fit into the openings provided in the upper frame member 98, as soon as the lower frame member 100 is in registry with, and mounted upon the studs 102.

Another particularly interesting feature and advantage of the present invention relates to the mode of storage of the stacks of cups within the enclosure 14. As particularly illustrated in FIG. 7, as well as in FIG. 3, the stacks of cups are stored directly in contact with one another, with no waste space required for individual magazine compartments for each cup stack. Thus, if small cups are employed, a greater number of stacks of cups may be accommodated within the enclosure 14 when it is fully filled. The rectilinear space for cups provided within the enclosure 14 is simply fully filled with stacks of cups, in whatever number may be inserted in front of the cup pusher 30 in its fully retracted position. Thus, no matter what size cups are employed, the cup stack storage space is completely utilized.

It is another interesting and important feature of the present invention that the cup stack advancing mechanism, including the reciprocating push rod 26, the clutch 28, and the cup stack pusher 30, automatically accommodates for different cup stack advancing travel required for different diameter cups. Thus, as previously explained, upon depletion of the cups in the first cup stack, the contacts of the cup stack advancing switch 38 are closed. These contacts remain closed to continue the energization of the cup stack advancing motor 22 until a new stack of cups 13 arrives at the first stack position and in registry with the bottom cup 31. At that time, the contacts of switch 38 are opened by the arrival of the new cup stack. Thus, the forward travel of the push rod 26 provided in a full revolution of the motor 22 need not necessarily bear any particular correlation with the cup stack advancement movement of the cup stack pusher 30 required to position a new stack of cups in the first stack position. More specifically, a number of repeated revolutions of the stack advancing motor 22 may be necessary in order to provide a number of reciprocations of the push rod 26 in order to advance one stack of cups of a particular size into the first stack position. On the other hand, only a part of a full revolution of the motor 22 may be required in order to advance the push rod 26 in a forward direction for a distance sufficient to push a new stack of cups into the first stack position. Thus, the operation of the stack advancing mechanism is completely independent of the cup diameter, and automatically accommodates to different cup diameters. Since a number of cups can be maintained in the bottom group of cups below the level 40 in FIG. 1, the cup stack advancing mechanism need not necessarily operate with great rapidity. This is true because a number of cups are available in this bottom group of cups to serve the beverage vending machine while a new stack of cups is advanced into the first cup stack position. Accordingly, the motor 22 may be a relatively small motor and the mechanical advantage afforded by the motor crank arm 88, and the arms of the bell crank 24 may be such as to gear down this motor to apply powerful short strokes to the rod 26 to accomplish the cup stack advancing operation by a number of revolutions of the motor 22. However, in a practical embodiment, it has been found to be desirable to provide for sufficient movement of rod 26 for a single cup stack advancing cycle by one or two complete revolutions of the motor 22. It will be understood that both of the motors 22 and 34 may be small synchronous motors having integral reduction gearing to provide appreciable torque at a relatively low power rating.

In view of the fact that the required movement of the rod 26 is a reciprocating movement, it will be obvious that the motor means for imparting such motion to the rod 26 need not necessarily be a rotational motor. Thus, an electromagnetic solenoid may be employed in place of the motor 22 as shown, in order to cause the appropriate rotations of the bell crank 24. An appropriate spring return would be required for the solenoid, and interrupting contacts of the kind commonly used on doorbell ringers would have to be provided for repeated energization and de-energization of the solenoid as long as rod advance movement was required.

With such a solenoid embodiment, it would also be possible to attach the solenoid plunger directly to the rod 26 and omit the bell crank 24. Various other modifications of this actuating arrangement are also possible.

It is thought that the invention, and many of its attendant advantages, will be understood from the foregoing description and it will be apparent that various changes may be made in the form, construction, and arrangement of the parts without departing from the spirit and scope of the invention or sacrificing all of its material advantages, the form herein before described being merely a preferred embodiment thereof.

What is claimed is:

1. Apparatus for storing and dispensing nesting disposable cups comprising:
   a cup separator positioned and arranged to support the cups in a first cup stack and to separate and dispense the bottom cup when required;
   a rack for slidably supporting each of a plurality of additional cup stacks in a column adjacent to the first cup stack;
   a switch positioned to be opened by the presence of a supply of cups in said first stack and operable to close upon the depletion of the cups in the first stack;
   a cup stack advancing mechanism connected for operation in response to the closure of said switch;
   said cup stack advancing mechanism including a cup stack pushing device for pushing the entire column of cup stacks along said rack toward said first stack position;
   means for driving said pushing device including an elongated member;
   motor means connected for imparting a reciprocatory movement to said elongated member; and
   a one-way friction clutch connected between said stack pushing device and said elongated member for driving said stack pushing device in the stack advancing direction only.

2. Apparatus for storing and dispensing disposable cups comprising:
   a storage enclosure for storing a plurality of stacks of nested disposable cups in a single column;
   a cup separator positioned and arranged to support the cups in the first cup stack position at one end of said column, said separator being operable to dispense one cup at a time from the bottom of said first stack and to support the cups in the first stack position at the rim of the bottom cup remaining in the stack;
   a rack for slidably supporting each of the cup stacks in addition to the first cup stack;
   a control switch positioned to be held open by the presence of a supply of cups in said first stack position and operable to close upon the substantial depletion thereof;
   a cup stack advancing mechanism connected for operation in response to the closure of said switch to advance said cup stacks until the cup stack in the second position is advanced to the first stack position to thereby open said switch;
   said advancing mechanism comprising an elongated member;
   a motor connected for imparting a reciprocatory movement to said elongated member in a direction parallel to the desired stack movement;
   a one-way friction clutch connected to engage with said elongated member in the stack advancing direction only; and
   a stack pushing device connected to said clutch for movement therewith.

3. Apparatus for storing and dispensing nesting disposable cups of the type having outwardly extending rim beads comprising:
   a storage enclosure for storing a plurality of stacks of nested disposable cups;
   a cup separator positioned and arranged to support the cups in the first cup stack position at the rim of the bottom cup and to separate and dispense the bottom cup when required;
   a rack for slidably supporting each of the stacks in addition to the first stack at an elevation above the top cup in a bottom group of the cups in the first stack;

a control switch positioned to be opened by the presence of a supply of cups in said first stack above the bottom group and operable to a closed contact position upon the depletion of the cups above said bottom group;

a stack advancing mechanism connected for operation in response to the closure of said switch and including a stack pushing device for pushing the column of stacks along said rack toward said first stack position;

means for driving said pushing device including an elongated member having motor means for imparting a reciprocatory movement thereto and a one-way friction clutch for driving said stack pushing device only in the stack advancing direction movement of said elongated member;

said advancing mechanism being operable until the cup stack in the second position is advanced to the first stack position to thereby open said switch.

4. Apparatus for storing and dispensing nesting disposable cups of the type having outwardly extending rim beads comprising:

a storage enclosure for storing a plurality of stacks of nested disposable cups in a serial columnar arrangement;

a cup separator positioned and arranged to support the cups in the first cup stack position at the rim of the bottom cup and to separate and dispense the bottom cup when required and to continue the support of the cups in the first cup stack position at the rim of the bottom cup remaining in the stack;

a rack for slidably supporting each of the cup stacks in addition to the first cup stack at an elevation maintaining the bottom cup of each of said other stacks above the top cup in a bottom group of the cups in the first stack;

a normally closed control switch positioned for operation to the open contact position by the presence of a supply of cups in said first stack above the bottom group, and operable upon the depletion of the cups above said bottom group to release and cause closure of the switch contacts;

a cup stack advancing mechanism connected for operation in response to the closure of said switch;

said cup stack advancing mechanism including a cup stack pushing device for pushing the entire column of cup stacks along said rack toward said first stack position by force exerted against the last stack within said storage enclosure;

means for driving said pushing device including an elongated member having motor means for imparting a reciprocatory movement to said elongated member in a direction parallel to the desired movement of said stack pushing device;

a one-way friction clutch connected between said stack pushing device and said elongated member for driving said stack pushing device in the stack advancing direction only during the advance phase of the reciprocatory movement of said elongated member;

said advancing mechanism being operable to advance said cup stacks until the cup stack in the second position is advanced to the first stack position and drops into nesting relation with the bottom group of cups to thereby operate said switch to the open position.

References Cited by the Examiner
UNITED STATES PATENTS

| | | | |
|---|---|---|---|
| 2,370,848 | 3/1945 | Doggett | 221—11 |
| 2,394,262 | 2/1946 | Reitsnyder et al. | 221—11 |
| 2,407,968 | 9/1946 | Von Stoeser | 221—11 |
| 2,840,963 | 7/1958 | Osmond | 221—222 X |
| 2,907,252 | 10/1959 | Owens | 221—222 X |
| 2,925,196 | 2/1960 | Stoner | 221—222 |
| 3,098,585 | 7/1963 | Giepen | 221—222 X |

SAMUEL F. COLEMAN, *Primary Examiner.*